(12) United States Patent
Pradella et al.

(10) Patent No.: US 12,157,103 B2
(45) Date of Patent: Dec. 3, 2024

(54) SYSTEM FOR CHEMICAL TRANSFORMATION OF 3D STATE MATERIALS

(71) Applicant: GREENBONE ORTHO S.P.A., Faenza (IT)

(72) Inventors: Lorenzo Giuseppe Pradella, Truccazzano (IT); Alberto Ballardini, Faenza (IT); Lorenzo Santi, Cervia (IT); Anna Tampieri, Faenza (IT); Simone Sprio, Bologna (IT); Andrea Ruffini, Faenza (IT)

(73) Assignee: GREENBONE ORTHO S.P.A., Faenza (IT)

( * ) Notice: Subject to any disclaimer, the term of this patent is extended or adjusted under 35 U.S.C. 154(b) by 857 days.

(21) Appl. No.: 17/267,301

(22) PCT Filed: Jul. 26, 2019

(86) PCT No.: PCT/EP2019/070155
§ 371 (c)(1),
(2) Date: Feb. 9, 2021

(87) PCT Pub. No.: WO2020/030442
PCT Pub. Date: Feb. 13, 2020

(65) Prior Publication Data
US 2021/0316263 A1    Oct. 14, 2021

(30) Foreign Application Priority Data
Aug. 9, 2018    (IT) .................. 102018000007993

(51) Int. Cl.
*B01J 3/03* (2006.01)
*B01J 3/00* (2006.01)
(Continued)

(52) U.S. Cl.
CPC ............... *B01J 19/18* (2013.01); *B01J 3/002* (2013.01); *B01J 3/008* (2013.01); *B01J 3/02* (2013.01);
(Continued)

(58) Field of Classification Search
None
See application file for complete search history.

(56) References Cited

U.S. PATENT DOCUMENTS 1,923,145 A * 8/1933 Harsch ................... C21D 9/663
432/12
5,769,965 A * 6/1998 Liedtke ............. F02M 51/0664
148/225
(Continued)

FOREIGN PATENT DOCUMENTS

CN    205761119 U    12/2016
CN    206492489 U    9/2017
(Continued)

OTHER PUBLICATIONS

International Search Report and Written Opinion for Corresponding International Application No. PCT/EP2019/070155 (13 Pages) (Oct. 2, 2019).
(Continued)

*Primary Examiner* — Jennifer A Leung
(74) *Attorney, Agent, or Firm* — LUCAS & MERCANTI, LLP

(57) ABSTRACT

A system for chemical transformation of 3D state materials is disclosed wherein, a reaction group having a main body arranged to shape a reaction chamber in which a component configured to support a sample of 3D state arranged to be chemically transform is expected. The system further includes an oven arranged to heat the reaction chamber and a GAS supply group arranged to release a first gas in the
(Continued)

reaction chamber and/or a casing component, inside the main body, which has a chemical agent suitable for releasing a second gas into the reaction chamber. The main body has at least two turbines arranged to converge into the reaction chamber, the first and/or the second gas on the samples. The invention relates also to a method for chemical transformation of 3D state materials.

10 Claims, 5 Drawing Sheets

(51) Int. Cl.
B01J 3/02 (2006.01)
B01J 3/04 (2006.01)
B01J 19/00 (2006.01)
B01J 19/18 (2006.01)
C01B 21/064 (2006.01)
C01B 21/068 (2006.01)
C01B 21/072 (2006.01)
C01B 21/076 (2006.01)
C01F 11/18 (2006.01)
C01G 23/00 (2006.01)
F27B 5/04 (2006.01)
F27B 5/16 (2006.01)
F27D 5/00 (2006.01)
F27D 7/02 (2006.01)
F27D 7/04 (2006.01)
F27D 7/06 (2006.01)

(52) U.S. Cl.
CPC ............... B01J 3/03 (2013.01); B01J 3/042 (2013.01); B01J 19/0066 (2013.01); B01J 19/0073 (2013.01); C01B 21/064 (2013.01); C01B 21/068 (2013.01); C01B 21/072 (2013.01); C01B 21/076 (2013.01); C01F 11/18 (2013.01); C01G 23/006 (2013.01); F27B 5/04 (2013.01); F27D 5/0056 (2013.01); F27D 7/02 (2013.01); F27D 7/04 (2013.01); *F27B 2005/161* (2013.01); *F27B 2005/168* (2013.01); *F27D 2007/045* (2013.01); *F27D 2007/063* (2013.01)

(56) References Cited

U.S. PATENT DOCUMENTS

| | | | |
|---|---|---|---|
| 2007/0232801 A1* | 10/2007 | Bairamijamal | C07D 251/60 544/201 |
| 2013/0064752 A1 | 3/2013 | Kim et al. | |
| 2018/0126462 A1 | 5/2018 | Murphree et al. | |

FOREIGN PATENT DOCUMENTS

| | | | |
|---|---|---|---|
| EP | 2722096 A1 | | 4/2014 |
| GB | 521661 A | * | 5/1940 |
| GB | 720359 A | * | 12/1954 |
| GB | 813192 A | * | 5/1959 |
| WO | 2008128545 A1 | | 10/2008 |
| WO | 2017021894 A1 | | 2/2017 |

OTHER PUBLICATIONS

Jiao-yu Shang, et al., "Study on Carbonation of Calicination in Oxy-Fuel Combustion", East China Electric Power, vol. 37, No. 6, (4 pages), 2009.

* cited by examiner

SYSTEM FOR CHEMICAL TRANSFORMATION OF 3D STATE MATERIALS

CROSS-REFERENCE TO RELATED APPLICATIONS

This application is a 371 of PCT/EP2019/070155, filed Jul. 26, 2019, which claims the benefit of Italian Patent Application No. 102018000007993, filed Aug. 9, 2018.

TECHNICAL FIELD

The present invention generally relates to a chemical transformation system for the realization, for example, of 3D state materials.

In particular, the present invention relates to a system for the realization, also in supercritical and/or critical conditions, of 3D inorganic materials at high reactivity.

Still more in particular the present invention relates to a system for chemical transformation of 3D materials without changing the structural hierarchy, for example, through heterogeneous reactions at high temperature and/or pressure among solid 3D precursors and highly reactive and homogeneous gas or gas mixtures.

BACKGROUND ART

Generally, processes for the preparation of 3D materials, for example, based on calcium carbonate ($CaCO_3$) at high reactivity to be used as precursors for the synthesis of calcium phosphates-based materials are known.

For example a process of this type is known from patent publication WO2017/021894_A1.

A problem found in the known process is that the transformation of 3D material from calcium oxide (CaO) to calcium carbonate ($CaCO_3$) is, generally, particularly critical due to lack of reagent homogeneity.

In particular, Applicants observed that a possible use, in the known process of carbon dioxide ($CO_2$) enriched of water ($H_2O$) does not always guarantee to obtain 3D materials with initial structure preserved and/or completely transformed from calcium oxide (CaO) to calcium carbonate ($CaCO_3$).

Applicants also observed that generally the known systems do not always guarantee to obtain 3D materials with initial structure completely preserved and/or at least partially transformed even in case of 3D materials based on nitrides, based on metal oxides, based on carbonates, etc.

Generally, Applicants observed that the known systems for transformation are not optimized to always guarantee the chemical transformation of 3D materials so that said materials, as regards the structure, are completely preserved and/or at least partially chemically transformed.

DISCLOSURE OF THE INVENTION

The object of the present invention is to solve in an optimized way the above mentioned problems of the prior art.

Such an object is achieved by the system for chemical transformation of 3D materials having the features set forth in the claims that follow.

The present invention relates also to a method for the realization, on 3D materials, of chemical converted and highly reactive surface layers with variable thickness.

The following synthetic description of the invention is given for the purpose of providing a basic understanding of some aspects of the invention.

This synthetic description is not an extended description and, as such, it is not intended as suitable to identifying key or critical elements of the invention or suitable to delineate the scope of the invention. Its only purpose is to introduce some contents of the invention in a simplified form as a preview of the below detailed description.

According to a feature of a preferred embodiment the system comprises a main body comprising a reaction chamber, in which one or more gas are released, and at least two turbines arranged to converge, in use, into the reaction chamber the one or more gas on 3D state material samples to be chemically transformed.

According to another feature the system is arranged to chemically transform the 3D state material samples in order to obtain 3D materials with initial structure preserved and/or completely or partially transformed.

According to another feature of the present invention the reaction chamber is realized so as to allow the release of one or more gas highly energized.

BRIEF DESCRIPTION OF DRAWINGS

These and other features and advantages of the present invention will appear more clearly from the following description of preferred embodiments provided by way of non limiting examples with the aid of the attached drawings, in which components designated by same or a similar reference numerals indicate elements having the same or similar functionality and constructions and wherein.

DESCRIPTION OF PREFERRED EMBODIMENTS

Here it is specified that in the context of the present description the terms: superior, inferior, vertical and possible further terms related to geometrical arrangement of the various components of the system are used in their conventional meaning.

Figure 1:
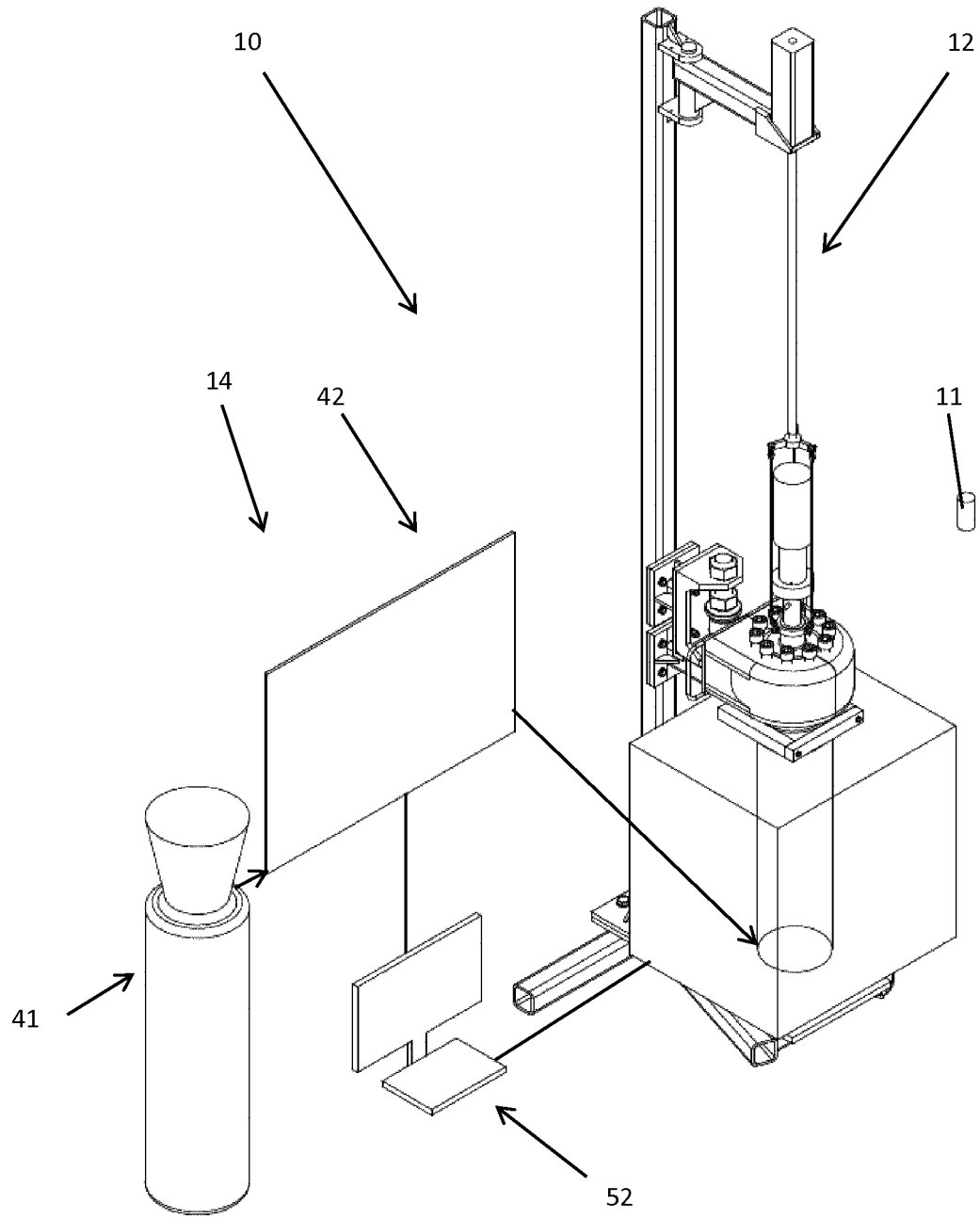
FIG. 1 shows a general scheme of a system for chemical transformation of 3D objects.
Figure 2:
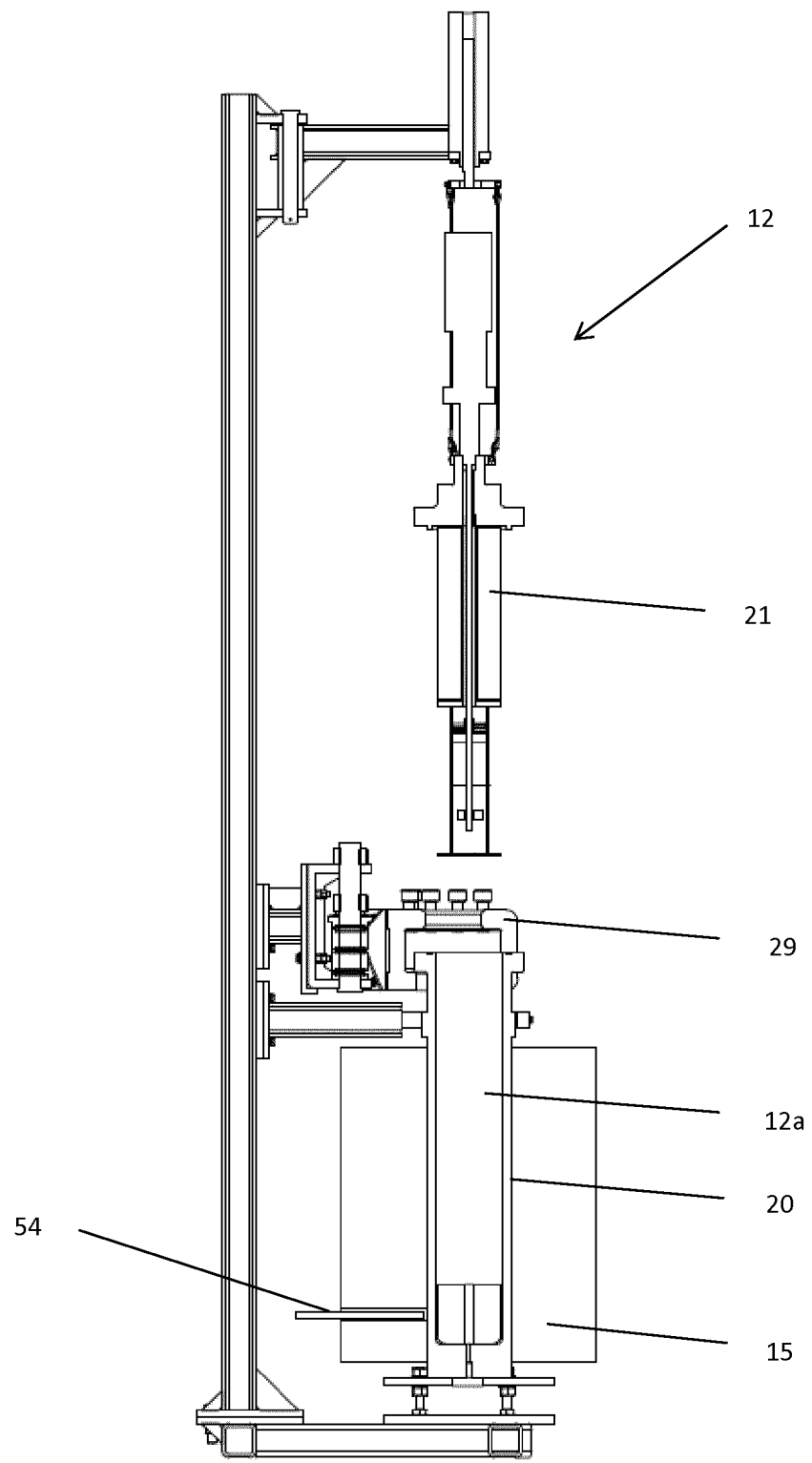
FIG. 2 shows a scheme of a reactor group of the system of FIG. 1.
Figure 3:
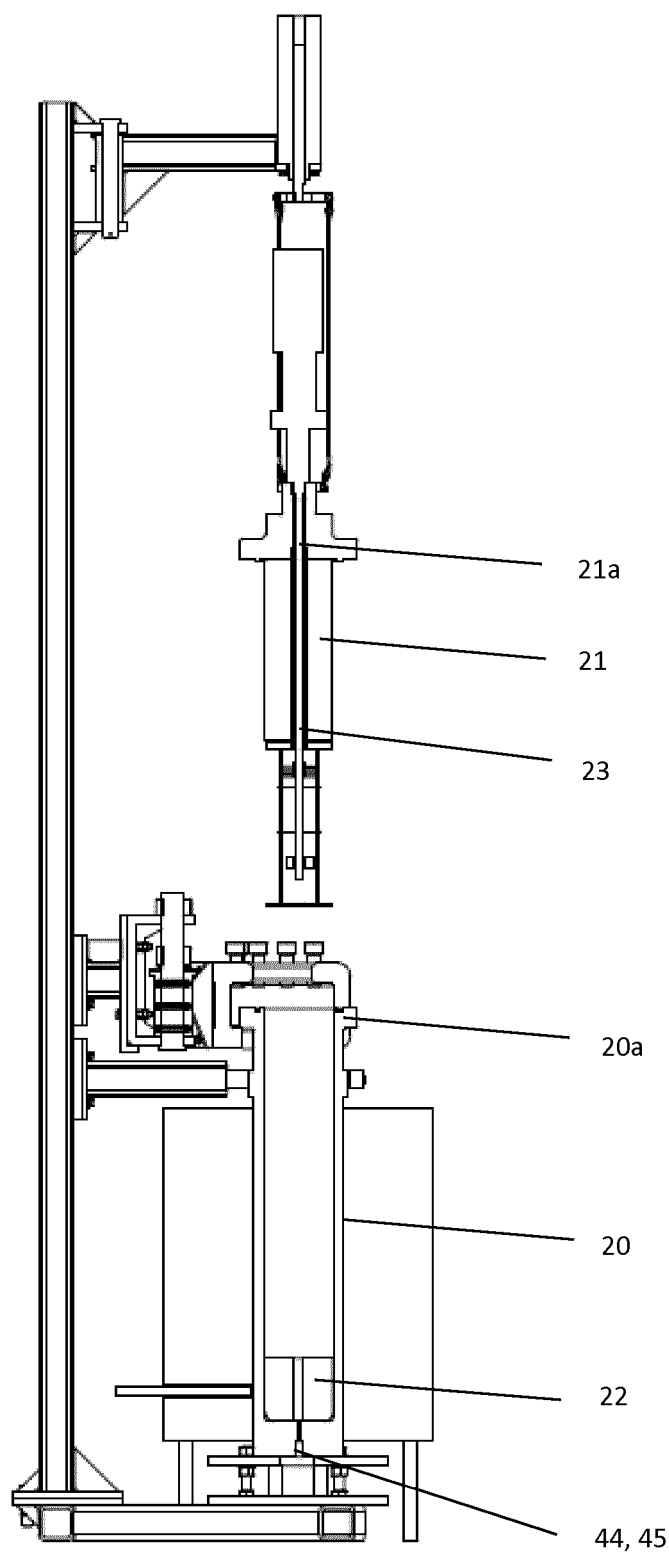
FIG. 3 schematically shows a section of the reactor group of FIG. 2.
Figure 4:
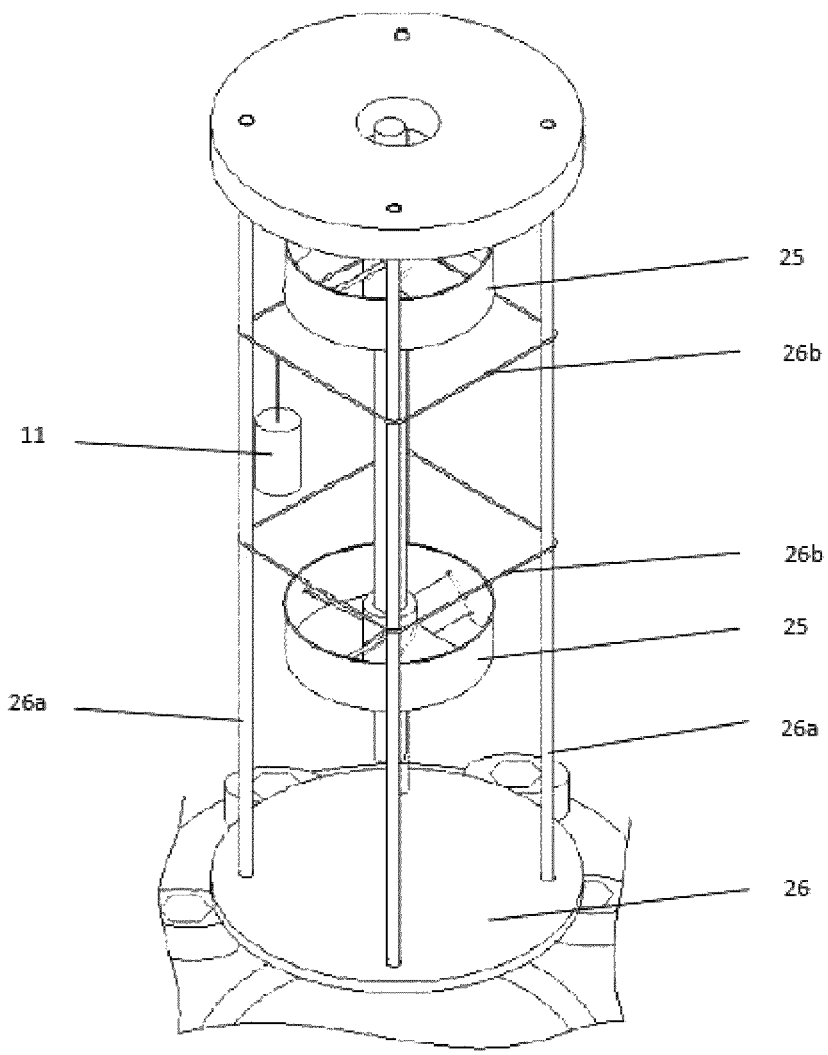
FIG. 4 schematically shows a particular of the reactor group of FIG. 2.

With reference to FIG. 1 a system for chemical transformation (system) 10 of samples 11 provided, for example, for the regeneration of bone tissue, comprises a reaction group or reactor group 12 and a gas supply group (gas group) 14 arranged to feed or release gas into the reactor group 12.

According to the preferred embodiment the gas group 14 comprises one or more gas cylinders 41 comprising reacting gas under pressure, for example carbon dioxide ($CO2$), and a gas control unit 42 arranged to suck air from the reactor group 12 by way of a known vacuum pump and to provide in a controlled way into the reactor group 12 gas coming from the one or more gas cylinders 41.

According to the preferred embodiment the gas control unit 42 is arranged to manage the flow of the reacting gas towards the reactor group 12.

Preferably the gas control unit 42 is arranged to control the flow of the gas into the reactor group 12 in an automated way, for example through an electronic pressure regulator or a mass flow regulator, controlled, in a known way, by a properly programmed PLC (Programmable Logic Controller).

Preferably, the gas control unit 42 comprises a pressure sensor device 45 and is connected to known-type devices, comprised in the reactor group 12, such as temperature sensor devices 44 (FIG. 1-FIG. 4). The system is arranged to acquire, by way of said devices, 44 and 45, and to show, for example, over time, data recording of temperature and/or pressure coming from the system 10.

The reactor group 12, for example of a metallic type and suitable to operate at high temperature and pressure, is arranged to transform in complete and uniform way the 3D samples from calcium oxide (CaO) to calcium carbonate ($CaCO_3$).

In the preferred embodiment the reactor group 12 comprises a main body 20, preferably cylindrical, configured so as to shape a chamber (reaction chamber) 12a, and a bottom 22, for example a flat bottom, placed at the base of the reactor group 12 and arranged, preferably, to be connected, in a known way, to the gas cylinders 41, to the vacuum pump and to temperature 44 and/or pressure sensor devices 45 through the gas control unit 42.

The main body 20 comprises, preferably, at a upper end, a flange 20a arranged to co-operate in sealing the reaction chamber 12a through one or more known-type seals.

The main body 20 further comprises, preferably, a top component 21, for example a top cap comprising a hole 21a, for example a central hole. The top component 21, preferably, is arranged to seal, in use, the reaction chamber 12a, to support the samples 11 and to allow the passage through the central hole 21a of an axis 23 arranged, in use, to rotate in a controlled way, clockwise or counterclockwise by way of a motor, for example, two groups of fixed blades or turbines 25 secured, according to the present embodiment, to the axis 23.

The turbines 25, preferably at least two, are, for example, secured to the axis 23, spaced apart from each other, and are arranged to converge on samples 11 between the turbines 25 the chemical substances (gas) present into the reaction chamber 12a.

The main body 20 also comprises, according to the preferred embodiment, a lower component 26, for example a casing component arranged to contain a chemical agent, for example calcium hydroxide ($Ca(OH)_2$), arranged to release, in use, steam into the reaction chamber 12a. The lower component or casing component 26 is connected, for example, to the top component 21 through a plurality of bars 26a that, in the preferred embodiment, comprise connection or hooking elements 26b arranged to support the samples 11 to be chemically transformed.

The main body 20 of the reactor group 12, preferably, is comprised inside an oven 15 arranged to heat, in use, in a controlled way, through, for example, electrical resistances placed in correspondence to the main body 20, the reaction chamber 12a of the reactor group 12.

Preferably, near the electrical resistances is placed an oven temperature sensor 54 arranged to acquire and transmit over time data recording of temperature coming from inside the oven 15 to an oven control unit 52, for example a known-type computer.

In use it is expected that the main body 20 can be sealed by means of jaws 29, for example two jaws, arranged to seal the flange 20a and the top component 21 of the main body 20.

According to the present embodiment it is expected that the main body 20 together with the components comprised in it, such as the top component 21, the lower component 26, the bars 26a and the hooking elements 26b, can be extracted, for example vertically, from the oven 15 in order to allow hooking to the hooking elements 26b the samples 11 to which the chemical reaction of transformation from calcium oxide (CaO) to calcium carbonate ($CaCO_3$) is applied.

The operation of the system as described above is the following.

Generally, the system 10 has been realized, according to the first embodiment, to perform carbonation processes, at high temperature and pressure, on material samples 11 made of calcium oxide (CaO) by way of chemical transformation of or reaction with carbon dioxide ($CO_2$) in the supercritical state and in the presence of steam ($H_2O$) which is suitable to catalyze the reaction. The final result of the process implemented by the system is to obtain samples made of calcium carbonate ($CaCO_3$), with the same initial macro- and microstructure of the samples 11 made of CaO.

In other words the carbonation reaction can be summarized according to the following Equation 1:

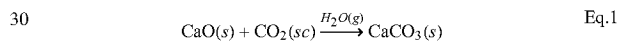

$$CaO(s) + CO_2(sc) \xrightarrow{H_2O(g)} CaCO_3(s) \qquad \text{Eq.1}$$

Wherein:
(sc)=supercritical state;
(s)=solid state;
(g)=gaseous state.

Start-Up Procedure

The start-up procedure of the system 10 comprises, for example, the following steps, also in a different order than the one listed here:

- a step (110) in which the jaws 29 are maintained open and the main body 20 and the components comprised in it are kept outside the oven 15;
- a step (120) in which a variable number of samples made of CaO, for example with total weight comprised in the range of about 50-500 g, is arranged inside the reaction chamber 12a and fixed to the hooking elements 26b. Preferably the samples are porous (e.g. 50% vol.), 3D and variable in shape (e.g. hollow cylinder, parallelepiped, etc.);
- a step (130) in which on the lower component 26 of the reaction chamber 12a is placed a chemical component arranged to be a source of $H_2O$, for example a component based on $Ca(OH)_2$;
- a step (140) in which the turbines 25, for example two turbines with blades at 45°, are placed along the axis 23 inside the reaction chamber 12a. Preferably it is expected that the turbines 25 are mounted with the blades in opposite position so that the samples 11 are arranged, in use, in an area between the turbines 25;
- a step (150) in which the main body 20 and the components comprised in it are lowered, inserted in the oven 15, the jaws 29 are closed and locked in order to seal the reaction chamber 12a;
- a step (160) in which the air present in the reaction chamber 12a is sucked by way of the vacuum pump controlled through the gas control unit 42;

a step (170) in which inside the reaction chamber 12a a predetermined amount of $CO_2$ coming from the GAS group 14 is charged, released or injected, in a controlled manner over time, through the gas control unit 42. Preferably, the amount of gas charged in the reaction chamber 12a is weighed, for example by means of a balance placed under the one or more gas cylinders 41. In particular, the amount of gas is stoichiometrically calculated, taking into account the expected consumption of $CO_2$ by the samples during the chemical transformation process, the desired final pressure and the volume of the reaction chamber 12a;

a step (180) in which, at the end of the loading of the amount of expected $CO_2$, the heating of the oven 15 is started, according to a predetermined thermic cycle, and the temperature, 44 and 54, and pressure detection sensors 45 are activated.

Transformation Procedure

The transformation procedure is carried out by checking over time the trend of pressure and temperature measured by the temperature sensor 44 comprised inside the reactor group 12, i.e. inside the reaction chamber 12a, and by the pressure sensor 45 comprised, preferably, in the gas group 14 and by the temperature sensor 45 comprised in the oven 15. Preferably, the pressure sensor 45 is located out of the reaction chamber to avoid it being affected by temperatures inside the reaction chamber itself.

According to other embodiments it is expected that the temperature sensor 54 comprised in the oven is not present and that it is sufficient to control the temperature through the temperature sensor 44 comprised in the reaction chamber.

Preferably the temperature and pressure trends are displayed on a computer, for example on the oven control unit 52 also connected, in known way, to the gas control unit 42. In the present description, the temperature and pressure trends are displayed in FIG. 5.

Figure 5:
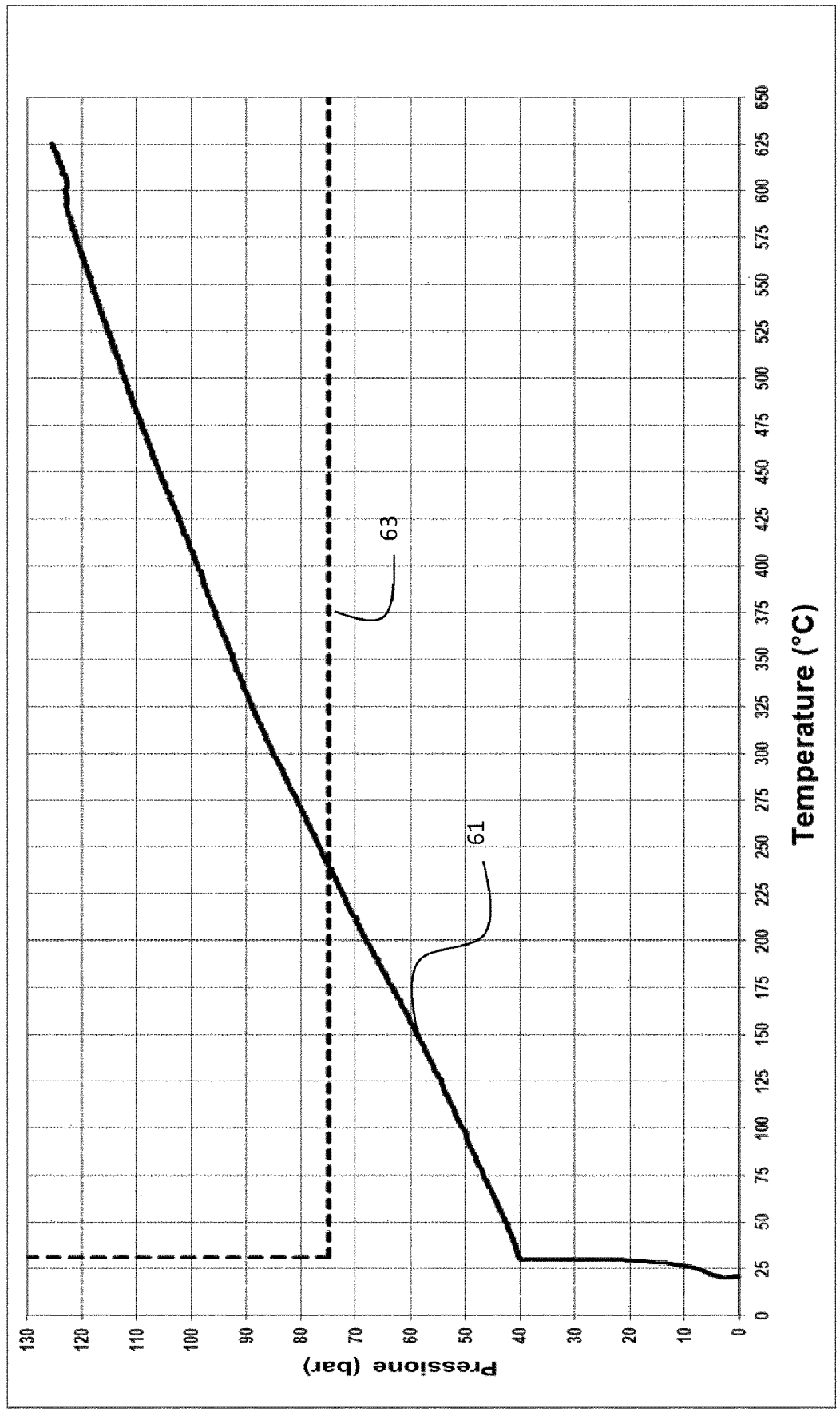
FIG. 5 represents a synthetic graph of temperature and pressure trends in the system for transformation according to a first embodiment.

As exemplified in FIG. 5 it has been verified experimentally that the trend of the pressure 61 (continuous line—secondary axis), after a charging initial phase, has a rise, for example starting from room temperature, and then proceeds with an almost linear trend due to the compromise between temperature rise (which causes an increased pressure) and consumption of $CO_2$ by the Cao (which causes a decreased pressure) of which the sample 11 is made.

Applicants have verified experimentally that in case of absence of samples the trend of the curve would be linear with a slope greater than the previous one.

Experimentally it has been also verified that $CO_2$ is placed in the supercritical state in the area of the diagram delimited by dashed line 63, for example with temperatures T>about 310° C. and P>72.9 atm.

Still more particularly it has been verified experimentally that the temperature from which starts the super-critical state is with temperature values at least higher than T>250° as a function of the amount of charged gas, of the ramp in time of temperature and of the number of samples.

Due to thermodynamic reasons linked to the reaction, only starting from about 300° C. and in presence of $CO_2$ the calcium hydroxide is able to free $H_2O$ in the reaction chamber. The $H_2O$ will mix with the $CO_2$ through the turbines 25, preferably mutually opposed, and starts the carbonation process of the samples made of CaO; the process can be represented by the following Equations 2 and 3 which are correspondent to the respective reactions:

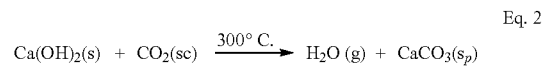

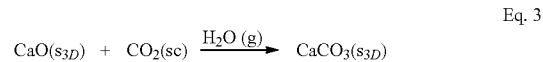

or also by summary Equation 4 of reactions 2 and 3:

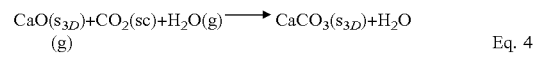

Wherein:
(sc)=supercritical state;
(s)=solid state shaped as powder (p) or 3D (3D);
(g)=gaseous state.

The Equation 4 shows that in the reactor group 12, i.e. in the reaction chamber 12a, it is occurring a direct reaction with mixture $CO_2/H_2O$, which does not require that the $CO_2$ is subjected to a preliminary hydration process.

Advantageously, thanks to the system 10, as described, ideal conditions of contextual hydration+carbonation are created.

As a matter of fact, in the described embodiment and in the concomitant carbonation process the formation of $Ca(OH)_2$ is locally limited in every instant of the process; as a matter of fact the newly created $Ca(OH)_2$ reacts immediately with $CO_2$ to generate $CaCO_3$.

With the introduction of the system 10 and, in particular, of the reactor group 12 comprising a plurality of blades or turbines 25 arranged to shake and contain near the samples 11 the substances present in the reaction chamber 12a, Applicants have experimentally verified that it is possible to create inside the same reaction chamber 12a, during the carbonation, an homogeneous, controlled and highly reactive $CO_2/H_2O$ mixture, without the need of a hydration process of $CO_2$ before the carbonation process.

In summary the system and, in particular, the described reactor group 12 are arranged to always guarantee samples completely transformed from calcium oxide (CaO) to calcium carbonate ($CaCO_3$) without the need of a hydration process of $CO_2$ before the carbonation process.

The system has been described by providing porous samples in CaO of variable shape.

As far as the Applicant have realized preferably the carbonation of samples of cylindrical shape with diameter comprised between Ø=30 mm and 10 mm, length comprises between 60 mm and 10 mm, weight comprises between 35 g and 2 g, it is easily understandable for a person skilled in the art that the samples can be of different shapes and sizes and weight even greater that those indicated as a function of the size of the reaction chamber, without departing from the scope of what has been described and claimed.

Similarly the samples can also be not porous or dense without departing from the scope of what has been described and claimed.

According to other embodiments it is expected to change the number or the arrangement of the turbines along the axis or, also, the shape of the turbines in order to change the type of gas turbulence inside the reaction chamber, especially as a function of placement, shape, size, weight, porosity or density of the samples. In case of high density samples it is expected that penetration depth of the transformation process from CaO to $CaCO_3$ is a function of the density of the samples.

According to some further embodiments it is expected, for example, the introduction in the reaction chamber of alternatives hydroxides with respect of the calcium, for example strontium hydroxide (release of $H_2O$ at $T>100°$ C.) or magnesium (release of $H_2O$ at $T>200°$ C.) in order to anticipate the startup of the carbonation of CaO.

According to other embodiments it is expected that the described system and method are used, for example, for the production of 3D materials based on nitrides:

nitrides (e.g. boron nitride (BN), silicon nitride ($Si_3N_4$), titanium nitride (TiN), aluminium nitride (AlN), etc.) for example following to reactions of 3D oxidic and not oxidic materials, with gas or gas mixture containing nitrogen (e.g. ammonia ($NH_3$), nitrogen ($N_2$), etc.).

In this case the gas group 14 comprises as reacting gas in pressure one or more gas cylinders containing nitrogen (e.g. ammonia (NH3), nitrogen (N2), etc.) and the reactor group 12 is substantially the same of the one described in the preferred embodiment with the only possible variant that the lower component 26 does not contain a chemical agent suitable to release steam, but however, if present, is connected to the top component 21 so as to allow hooking samples 11. In case of absence of the lower component 26, the only top component allow hooking samples to the reactor group 12.

The operation of the system 10 in case of nitrides requires that a chemical reaction takes place between a 3D solid oxide and/or a $NH_3$—$H_2O$ mixture in presence of $NH_3$, coming for example from the gas group 14 or from the lower component 26 (for example by way of generation of reactive $NH_3$ starting from subject to deterioration salt containing nitrogen).

The chemical transformation can be represented, for example, in the following way, respectively:

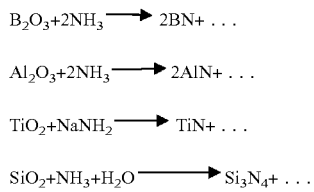

Wherein:

... represent secondary products, as easily understandable by a person skilled in the art.

In addition to the nitriding processes, for example, metal nitrocarbonization processes in presence of $NH_3+CO_2$ mixture or metal oxycarbonation processes in presence of $NH_3+H_2O$ mixture can also be expected as comprised in the object of the system 10 as described.

According to further embodiments it is expected that the described system and method are used, for example, for the production of 3D materials based on metal oxides:

metal oxides, such as titanium oxide ($TiO_2$), silicon oxide ($SiO_2$), zinc oxide (ZnO), iron oxide (FeO, $Fe_2O_3$, etc.) etc., for example following to reactions of metal and not metal 3D materials with water ($H_2O$);

mixed metal oxides, such as titanates (ex. lead titanate ($PbTiO_3$), calcium titanate ($CaTiO_3$), etc.), zirconate (ex, $SrZrO_3$, etc.), silicates (ex. $CaSiO_3$, etc.), aluminate (ex. $MgAl_2O_4$, etc.), etc., for example following to reactions of oxidic and not oxidic 3D materials with water ($H_2O$) and with the possible presence of precursors of different nature.

In this case the gas group 14 could be not present and the reactor group 12 is substantially the same as the one described in the preferred embodiment.

The operation of the system 10 in case of metal oxides provides that a chemical reaction will be realized as shown below:

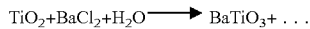

Wherein:

... represent secondary products, as easily understandable by a person skilled in the art.

According to another further embodiments it is provided that the described system and method are used, for example, for the production of 3D materials based on carbonates:

carbonates, such as magnesium carbonate ($MgCO_3$), mixed carbonate (e.g. $CaMg(CO_3)_2$, $Co_2(OH)_2CO_3$), for example following to reactions of oxidic and not oxidic 3D materials with water ($H_2O$) and carbon dioxide ($CO_2$);

sulphates, such as calcium sulfate ($CaSO_4$), for example following to reactions of oxidic and not oxidix 3D materials with water ($H_2O$) and sulfur oxide ($SO_3$).

In this case the reactor group 12 is substantially the same as the one described for the first preferred embodiment.

The operation of the system 10 in case of carbonates provides that a chemical reactions will be realized as shown below:

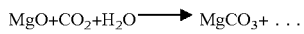

Wherein:

... represent secondary products, as easily understandable by a person skilled in the art.

Advantageously it will be appreciated that in all the embodiments the presence, for example, of at least two groups of fixed blades or turbines 25 are provided to the axis 23, according to the exemplary embodiments.

The groups of blades or turbines 25 are, preferably, fixed to the axis 23 and are arranged so as to converge, among the group of shovels or turbines 25, the substances present inside the reaction chamber 12a in which the samples are comprised.

Example of Carbonation Process

It is shown below, for completeness of description, an example of the carbonation process used to realize intermediate steps of a more complex process arranged for generating 3D samples made of hydroxyapatite starting from natural porous structures:

introducing samples made of CaO 11: about 100 g, in the reaction chamber 12a;

introducing $Ca(OH)_2$, about 100 g, in the reaction chamber;

charging $CO_2$: about 1300 g in an available volume into the reaction chamber of about 15 liters;

with molar ratio $CO_2:H_2O=10:1$ at $300°$ C.;

$CO_2$ molar consumption during the reaction: about 10% of all the initially charged $CO_2$;

thermic cycle: from about 20-620° C. in 735 minutes;

final pressure: in the range of about 120-130 bar.

Of course, obvious changes and/or variations to the above disclosure are possible, as regards dimensions, shapes, materials, components and connections, as well as details of the described construction and operation method without departing from the scope of the invention as specified in claims that follow.

The invention claimed is:

1. A system for chemical transformation of 3D (three-dimensional) state materials, comprising:
   a gas supply group configured to release a first gas into a sealed reaction chamber, and
   a reaction group comprising
      a main body and a top component configured to be inserted into and extracted from the main body in a sealable manner thereby defining the sealed reaction chamber upon the top component being inserted into and locked to said main body, said main body comprising at least one component configured to support one or more 3D samples arranged within said sealed reaction chamber to be chemically transformed,
      an oven configured to receive the main body and configured to heat at predetermined temperatures the sealed reaction chamber defined by the main body and the top component, and
      optionally, a casing component disposed inside the main body and containing a chemical agent to release a second gas into the sealed reaction chamber,
   wherein said main body further includes
      after insertion of the top component, a rotatable axial member extending into the main body and the sealed reaction chamber, the rotatable axial member being coupled to at least two turbines spaced apart from each other along the rotatable axial member, the at least two turbines being configured to direct said first gas, and said second gas, onto the one or more 3D samples disposed between the at least two turbines, and
   wherein the at least one component is configured to support the one or more 3D samples within the sealed reaction chamber in a manner such that the one or more 3D samples is disposed between the at least two turbines.

2. The system according to claim 1, wherein said chemical agent contained in said casing component, releases steam as said second gas.

3. The system according to claim 1, wherein
   said one or more samples are made of calcium oxide (CaO),
   said gas supply group is configured to release carbon dioxide ($CO_2$) as said first gas,
   said chemical agent is configured to release steam ($H_2O$) as said second gas,
said chemical transformation being carried out by way of carbon dioxide ($CO_2$) at supercritical state and in the presence of steam ($H_2O$).

4. The system according to claim 1, wherein
   said one or more 3D samples are made of materials comprising
   solid oxides,
   and wherein
      said gas supply group, or said chemical agent, releases ammonia ($NH_3$) as said first gas or said second gas,
   said chemical transformation being carried out in the presence of ammonia ($NH_3$).

5. The system according to claim 1, wherein
   said one or more 3D samples are made of materials comprising metals or metal salts,
   and wherein
      said gas supply group or said chemical agent releases steam ($H_2O$) as said first gas or said second gas,
   said chemical transformation being carried out in the presence of steam ($H_2O$).

6. The system according to claim 1, wherein
   said one or more 3D samples are made of materials comprising oxides, and
   said gas supply group is configured to release carbon dioxide ($CO_2$) as said first gas,
   said chemical agent releases steam ($H_2O$) as said second gas,
   said chemical transformation being carried out in the presence of carbon dioxide ($CO_2$) and steam ($H_2O$).

7. The system according to claim 2, wherein
   said one or more 3D samples are made of materials comprising
   solid oxides,
   and wherein
      said gas supply group or said chemical agent releases ammonia ($NH_3$) as said first gas or said second gas,
   said chemical transformation being carried out in the presence of ammonia ($NH_3$).

8. The system according to claim 2, wherein
   said one or more 3D samples are made of materials comprising metals or metal salts,
   and wherein
      said gas supply group or said chemical agent releases steam ($H_2O$) as said first gas or said second gas,
   said chemical transformation being carried out in the presence of steam ($H_2O$).

9. The system according to claim 2, wherein
   said one or more 3D samples are made of materials comprising oxides, and
   said gas supply group releases carbon dioxide ($CO_2$) as said first gas,
   said chemical agent releases steam ($H_2O$) as said second gas,
   said chemical transformation being carried out in the presence of carbon dioxide ($CO_2$) and steam ($H_2O$).

10. The system according to claim 1,
    wherein said top component has a portion providing the main body and the sealed reaction chamber with the rotatable axial member upon insertion of the top component, the at least two turbines coupled to the rotatable axial member.

* * * * *